Nov. 11, 1924.  1,515,403

A. J. OHLSEN

DEVICE FOR TEACHING PIANO PLAYING

Filed Sept. 11, 1922  3 Sheets-Sheet 1

Inventor
Arnold J. Ohlsen
By John A. Bommhardt
Att'y

Nov. 11, 1924. 1,515,403
A. J. OHLSEN
DEVICE FOR TEACHING PIANO PLAYING
Filed Sept. 11, 1922 3 Sheets-Sheet 2

Nov. 11, 1924.  
A. J. OHLSEN  
1,515,403  
DEVICE FOR TEACHING PIANO PLAYING  
Filed Sept. 11, 1922 3 Sheets-Sheet 3

Inventor
Arnold J. Ohlsen
By John A. Bommhardt
Att'y

Patented Nov. 11, 1924.

1,515,403

UNITED STATES PATENT OFFICE.

ARNOLD J. OHLSEN, OF CLEVELAND, OHIO.

DEVICE FOR TEACHING PIANO PLAYING.

Application filed September 11, 1922. Serial No. 587,389.

*To all whom it may concern:*

Be it known that I, ARNOLD J. OHLSEN, a citizen of the United States, residing at Cleveland, in the county of Cuyahoga and State of Ohio, have invented certain new and useful Improvements in Devices for Teaching Piano Playing, of which the following is a specification.

This invention relates to devices for teaching piano playing, and has for its object to provide an improved device which can be applied to existing pianos for the purpose of giving instruction in the art of piano playing. This is accomplished by means of a traveling sheet, somewhat similar to the note sheet of an automatic piano player. This traveling sheet or chart extends the whole width of the key board and is provided with marks of various kinds which are lined up with the corresponding keys on the key board, and as the sheet travels the keys indicated by the marks can be struck by the player when the marks reach a position adjacent to the key board. Means are provided for driving the indicating sheet, and these means as shown include a treadle, but obviously the sheet could be driven by a motor or otherwise.

Figure 1:
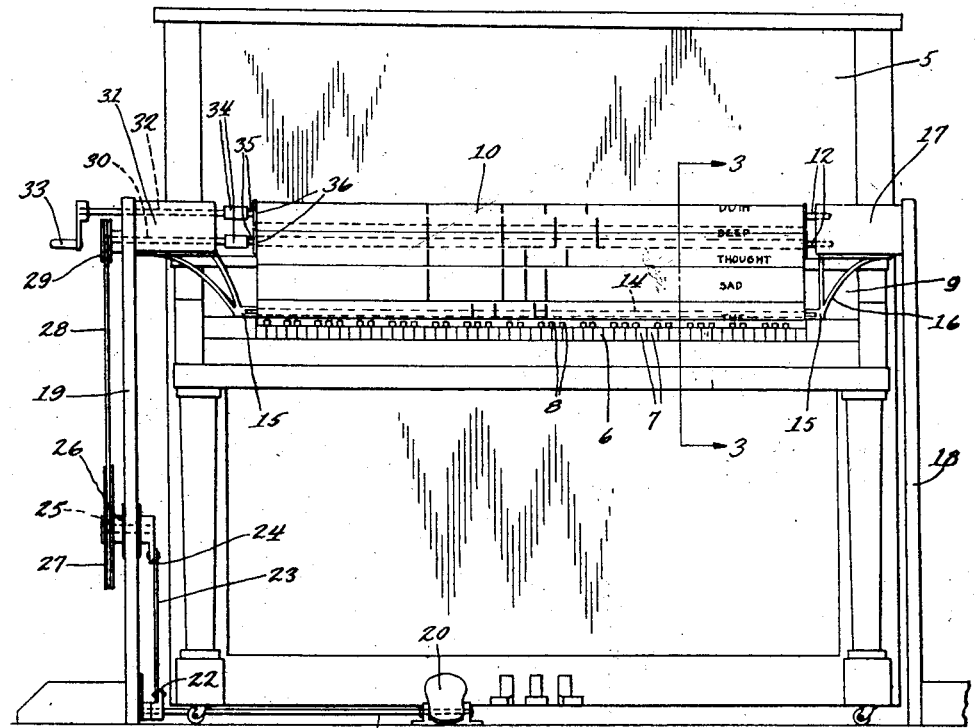
Figure 2:
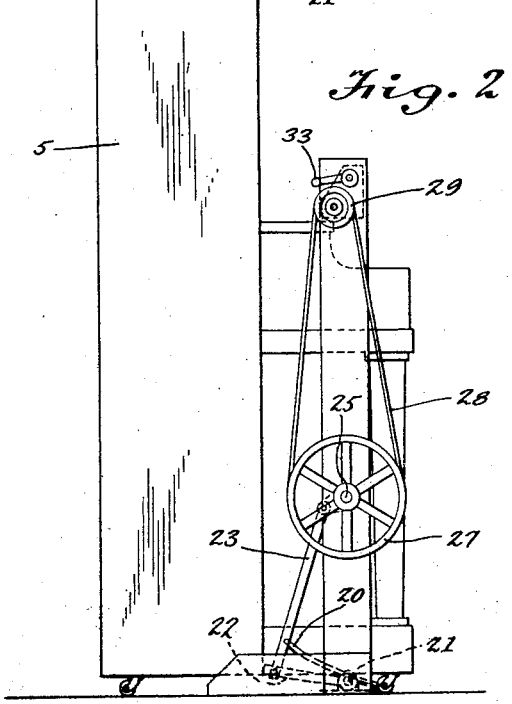
Figure 3:
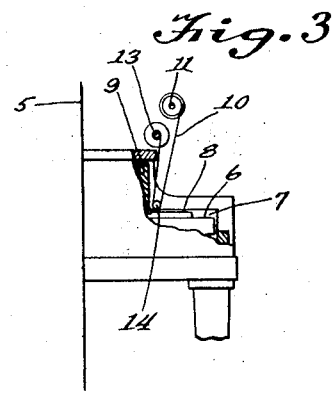
Figure 4:
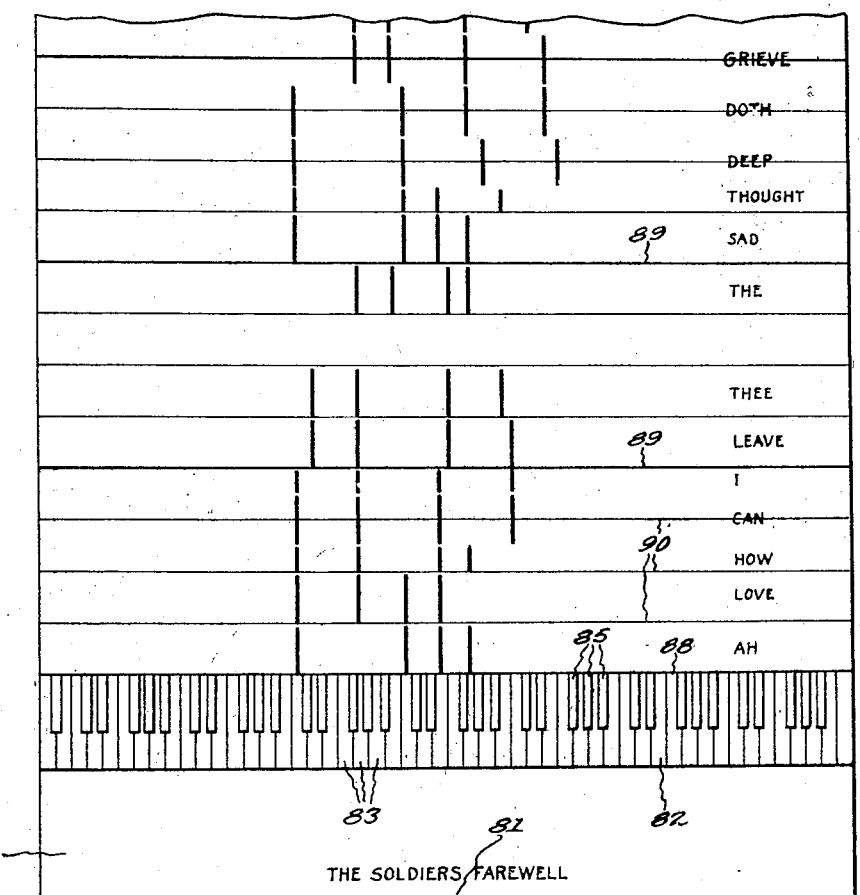
Figure 4:
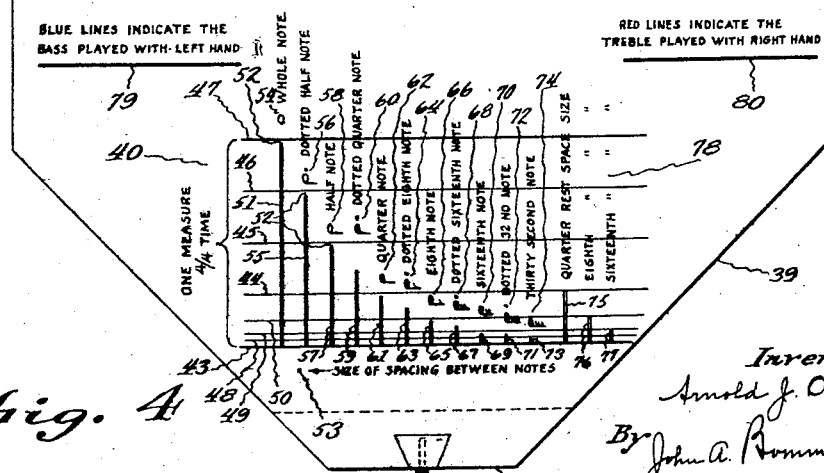
Figure 5:
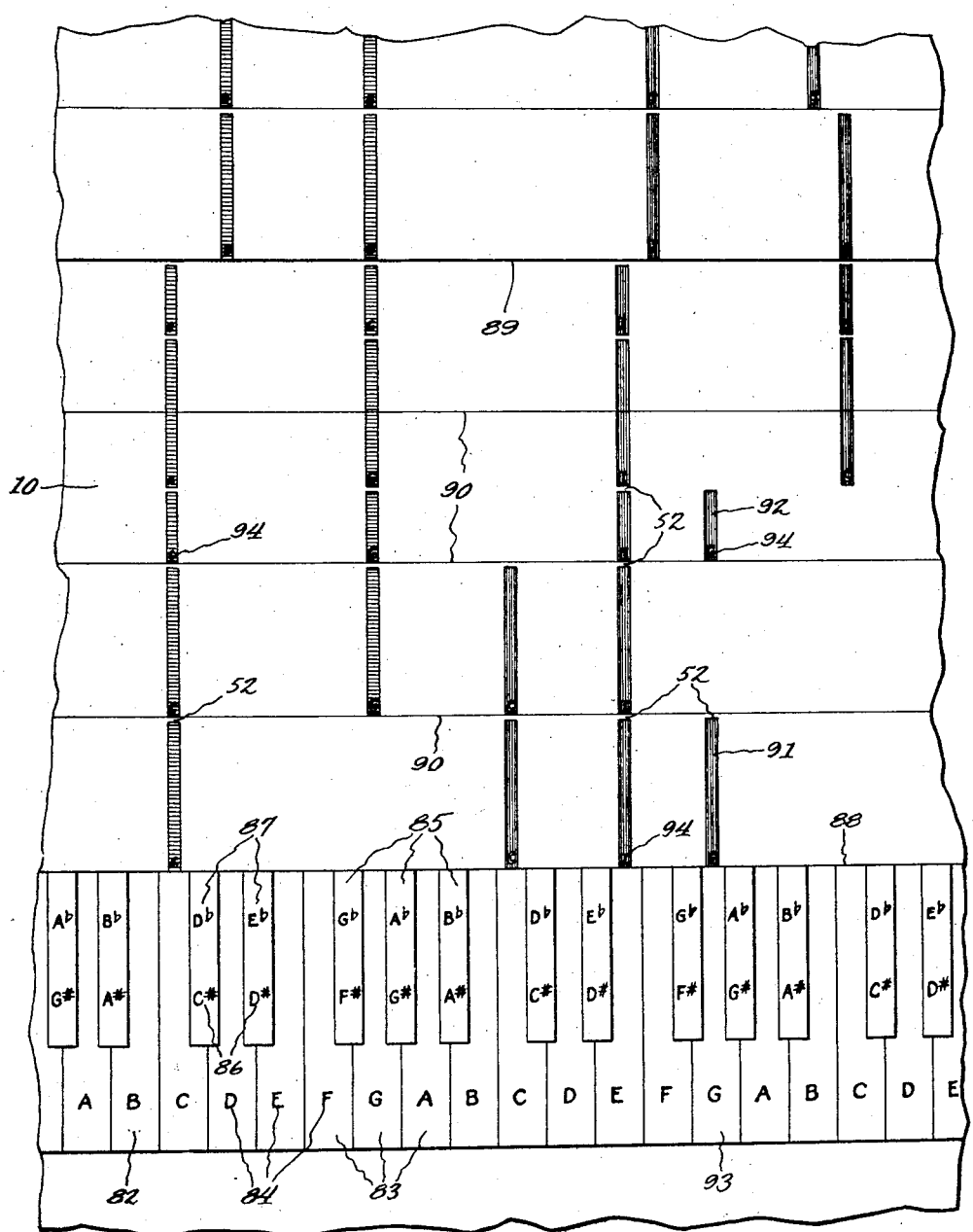

In the accompanying drawings Fig. 1 is a front elevation of a piano with a device applied thereto. Fig. 2 is an end view of the same. Fig. 3 is a section on the line 3—3 of Fig. 1. Fig. 4 is an enlarged plan view of the beginning of the instruction sheet. Fig. 5 is a further enlarged fragmentary view of a section of the instruction sheet.

In the accompanying drawings, 5 indicates an ordinary upright piano having a keyboard 6 with white keys indicated at 7 and black keys indicated at 8, and the keyboard cover is indicated at 9.

The instruction sheet or chart is indicated at 10, and will be hereinafter more particularly described. It unwinds from a spool 11 supported by trunnions 12 and winds up on a spool 13, passing intermediately over a roller 14 which is removably mounted in bearings 15 supported by brackets 16 carried by blocks 17 and 31, the former block is mounted on a stand 18 at one end of the piano, and the latter is supported by a stand 19 at the opposite end, and the blocks 17 and 31 also provide supporting bearings for the spools and operating shafts to be described.

20 indicates a treadle on the floor in front of the piano, and this treadle operates a rock shaft 21 having an arm 22 connected by a rod 23 to a crank 24 on a shaft 25 mounted in a bearing 26 on the stand 19, said shaft carrying a pulley 27 connected by a belt 28 to a pulley 29 on a shaft 30 mounted in the block 31 at the top of the stand. 32 is a rewind shaft supported in said block and provided with a handle 33, and 34 are sliding chucks mounted on the inner ends of the shafts 30 and 32 for gripping the spool trunnions 35 and turning the same. The spools have flanges 36 to guide the sheet.

Referring now to the instructor sheet particularly, 10 indicates the roller sheet generally which consists of a strip of heavy paper or other suitable material fastened at one end to its spool 11 and wound thereon, the free end having its corners beveled as at 39 and reinforced at 41. A metal ring 42 is fastened to the reinforced end 41 for hooking to the winding spool 13. Back of the edge 41 an instruction key 40 is printed. Instruction key 40 consists of straight lines extending laterally across the sheet; these lines indicating the time division of a measure of music. The composition shown in the drawings is written in 4/4 time having four beats to a measure.

The space embraced by the bracket 42 indicates the time of a measure of music as from line 43 to line 47, the intermediate lines 44, 45 and 46 dividing the measure into four equal quarters or beats as in 4/4 time. For purposes of instruction the measure is further divided by lines 48, 49 and 50. The space from line 43 to line 48 being one thirty second of the space between lines 43 and 47 indicates one thirty second of a measure. The space from line 43 to line 49 indicates one sixteenth of a measure and the space from line 43 to line 50 indicates one eighth of a measure. The lines 43 and 47 are printed heavier and broader than the lines 44, 45, 46, 48, 49 and 50 to form a contrast between the whole measure and the divisions.

The notes are indicated by broad lines starting at line 43 and extending at right angle across the aforedescribed measure lines. 51 is a broad line denoting a whole note, the note line 51 starting at the measure line 43 extends to adjacent the measure line 47, a small space 52 being left between end of the line 50 and the measure line 47 to indicate end of the note. The size of this space is printed on the sheet as at 53 with a proper notation indicating its purpose. If this spacing were not provided, a note to be struck a consecutive number of times would appear as one note of a longer duration. The space separates the notes as shown on the drawings. Since note line 51 plus its space 52 extends across the measure, it is apparent that it is a whole note of four beats, also designated as such by a whole note music symbol and the name "whole note" following as at 54. The whole note is at the left of the key 40, the smaller notes are printed in successive decreasing values reading left to right. Next to whole note line 51 is a dotted half note line 55 extending from measure line 43 to within a space 52 of line 46 which divides the measure into three quarters, hence note line 55 has a value of three beats and is designated by a dotted half note music symbol 56 and the name "dotted half note." Next is a half note line 57 starting as before from measure line 43 and together with its space 52 extending to line 45 which divides the measure in half and is designated by a half note music symbol 58 and the printed name "half note." In a like manner the next successive notes in decreasing values down to a thirty-second note are printed starting from the measure line 43 and together with their space 52 occupying that fraction of the measure relative to the note value. Note line 59 and its symbol 60 is a dotted quarter note, note line 61 and its symbol 62 is a quarter note, note line 63 and its symbol 64 is a dotted eighth note, note line 65 and its symbol 66 is an eighth note, note line 67 and its symbol 68 is a dotted sixteenth note, note line 69 and its symbol 70 is a sixteenth note, note line 71 and its symbol 72 is a dotted thirty-second note, and note line 73 and its symbol 74 is a thirty-second note.

Rest space sizes to guide the pupil are indicated on the key 40 by double lines 75, 76 and 77 which indicate quarter eight and sixteenth rest space sizes, the double lines starting from measure line 43 extending to that fraction of the measure such as a quarter, eight and sixteenth and are indicated by the printing 78. Other notes and symbols may be indicated on the key 40 if necessary or desired for instructing the pupil.

Back of the key 40 and to the left of the sheet 10 is printed a horizontal blue line 79 with the notation above, "blue lines indicate the bass played with left hand" and printed on the right hand side of the sheet opposite is a red horizontal line 80 with the notation above "red lines indicate the treble played with right hand." Still further back on the sheet is a space for the title and composers name to be printed as at 81.

A piano keyboard 82 is printed back of the title, extending transversely the width of the sheet 10. The names of the keys are printed on each, the naturals or white keys 83 are designated by the letters or symbols 84 and the black keys 85 or the sharps and flats are designated by the sharp symbols 86 and flat symbols 87.

The music starts at the back line 88 of the key board 82, the measures are divided by heavy transverse lines 89, the distances between corresponding to the distance between lines 43 and 47 of the instructor key 40. The measures are further divided into four quarters by the lighter transverse lines 90 corresponding to quarter spacing lines 44, 45 and 46 of the instructor 40. As before stated the music starts at line 88, the notes required are printed directly behind and in line with the corresponding keys on the keyboard 82 and extend in direct lines longitudinally of the sheet 10. For instance referring to Fig. 5, 91 is a G quarter note in the treble a rest of one quarter occurs and then a G eighth note 92, both notes are in line with the G key 93 on the key board 82. The notes of the treble are broad red lines and the bass broad blue lines as indicated by the vertical and horizontal hatching respectively. Each note at the bottom is printed or blocked out as at 94 with its symbol.

At the extreme right of the sheet 10, the words of the composition are written at the proper intervals in the measures opposite in relation to the note lines.

To apply the instructor to a piano, the stands 18 and 19 are placed in position relative to the piano and the rolled sheet 10 and winding spool trunnions 12 are inserted in their bearing in block 17, the other ends 35 are inserted in the chucks 34. The eye 42 is then hooked to the winding spool and roller 14 is inserted in the sheet loop and placed in position in its bearings 15. As shown in Fig. 3 the roller 14 just clears the black keys on the piano keyboard and is positioned back adjacent the folded keyboard cover. The sheet 10 feeds from spool 11 down in front of the player, passes under the roller 14 and is wound on spool 13 which is turned by the shaft 30 driven through pulley 29, belt 28 and pulley 27. The pulley 27 is rotated by the crank 24 through shaft 25, link 23 pivoted to crank 24 and rocker arm 22 rocked by foot treadle 20 through shaft 21. To rewind the spool and roll 11, the handle 33 is rotated, winding through shaft 32 and chuck 34. The roll 10 is adjusted laterally over the piano keyboard 6 by aligning the printed keyboard on the roll to match corresponding keys. The roll is then fed out, the keys are struck as the corresponding printed note descends to the edge of the piano keyboard, the keys being released as the end of the note passes under the roll 14.

The invention is not limited in any way to the particular mechanism shown, but various changes may be made within the scope of the following claim.

I claim:

An instruction device for keyboard instruments comprising a sheet extending across the keyboard provided with marks indicating particular keys, portable supports standing beside the instrument and unconnected therewith, bearing blocks at the top of said supports, a pair of spools journaled in said blocks and to which the ends of the sheet are connected, brackets depending from said blocks to positions adjacent opposite ends of the keyboard, a roller mounted in bearings in said brackets and around which the sheet extends closely adjacent the keyboard, and means mounted on one of said supports to revolve one of the spools.

In testimony whereof, I affix my signature in presence of two witnesses.

ARNOLD J. OHLSEN.

Witnesses:
JOHN A. BOMMHARDT,
BESSIE F. POLLAK.